United States Patent [19]

Fukunaga et al.

[11] Patent Number: 4,795,605
[45] Date of Patent: Jan. 3, 1989

[54] NUCLEAR FUSION APPARATUS

[75] Inventors: Tokio Fukunaga; Fukutaro Kishimoto; Mitsuru Sato; Kazuyoshi Yabuuchi, all of Amagasaki; Haruhiko Tomita, Tokyo; Kazuo Maeno, Amagasaki, all of Japan

[73] Assignee: Mitsubishi Denki Kabushiki Kaisha, Japan

[21] Appl. No.: 860,487

[22] Filed: May 7, 1986

[30] Foreign Application Priority Data

| May 9, 1985 [JP] | Japan | 60-98621 |
| Feb. 27, 1986 [JP] | Japan | 61-40480 |
| Feb. 27, 1986 [JP] | Japan | 61-40481 |

[51] Int. Cl.$^4$ .......................................... G21B 1/00
[52] U.S. Cl. ................................ 376/142; 335/216; 336/229
[58] Field of Search ............... 376/142; 335/216, 298; 336/65, 196, 199, 208, 298, 299

[56] References Cited

U.S. PATENT DOCUMENTS

| 3,559,126 | 1/1971 | Drautman | 335/216 |
| 3,736,539 | 5/1973 | File et al. | 335/216 |
| 4,174,254 | 11/1979 | Gaines | 376/142 |
| 4,287,022 | 9/1981 | Penfield | 376/142 |
| 4,378,545 | 3/1983 | Bonanos | 335/216 |
| 4,497,767 | 2/1985 | Gaines | 376/142 |

FOREIGN PATENT DOCUMENTS 59-102187  6/1984  Japan .................................. 376/142

OTHER PUBLICATIONS

Assembly of TFTR, G. H. Rappe, IEEE, 1979.

Primary Examiner—Deborah L. Kyle
Assistant Examiner—Richard L. Klein
Attorney, Agent, or Firm—Leydig, Voit & Mayer

[57] ABSTRACT

A nuclear fusion apparatus comprises a central support stay device having a central support stay portion and a plurality of radial portions radially extending from the central support stay portion and circumferentially spaced from each other at predetermined angles, a plurality of poloidal coils disposed in the circumferential direction of the central support stay device and supported by the radial portions, and a plurality of toroidal coils radially disposed around the central support stay device and adjacent the radial outer ends of the radial portions.

18 Claims, 10 Drawing Sheets

NUCLEAR FUSION APPARATUS

BACKGROUND OF THE INVENTION

The present invention relates to a nuclear fusion apparatus, and in particular, to the structure of a central support member for supporting a plurality of poloidal coils in a tokamak type nuclear fusion apparatus.

In a conventional tokamak type nuclear fusion apparatus such as the one disclosed in Japanese Laid-Open Pat. No. 54,3695, as shown in FIG. 1, a plurality of toroidal coils 2 are radially disposed around a central support stay 1, and a plurality of poloidal coils 3 are circumferentially disposed around the central support stay 1 and spaced from each other along the axial direction thereof, i.e., direction Z in FIG. 1. Electrically insulating materials 5 are radially disposed in the central support stay 1 along the axis thereof to interrupt undesirable electric current in the circumferential direction of the central support stay 1 as described later.

In the nuclear fusion apparatus described above, an electric current is made to flow through the toroidal coils 2 to confine plasma 4 within the bounds of the coils 2 and an electric current is also made to flow through the poloidal coils 3 to stabilize the position of the plasma 4. At this time, in the toroidal coils 2, an electromagnetic force caused by their respective electric currents is generated as a centripetal force in a radial direction, i.e., direction R in FIG. 1. In the central support stay 1, a voltage in the circumferential direction i.e., direction $\theta$ is generated by the electric current flowing through the poloidal coils 3.

Accordingly, it is necessary for the central support stay 1 to withstand the centripetal force of the toroidal coils and it is necessary to interrupt the undesirable electric current through the central support stay 1 in the circumferential direction thereof. In the conventional apparatus, the central support stay 1 has a cylindrical shape to withstand the centripetal force and is divided into a plurality of segments in the circumferential direction thereof, with the electrically insulating materials 5 disposed between the segmented portions to interrupt undesirable electric current in the circumferential direction.

In the conventional nuclear fusion apparatus mentioned above, it is difficult to design a central support stay 1 as a structure being circumferentially divided yet still highly rigid in the radial direction. Furthermore, in the conventional apparatus, in order to supply the electric current to the poloidal coils 3, it is necessary to dispose holes on the side surface of the central support stay 1 for passing lead wires therethrough and to carry out brazing etc. in the assembly of the central support stay 1.

Furthermore, in the conventional nuclear fusion apparatus, it is not easy to dispose the poloidal coils in predetermined positions.

To overcome the problems mentioned above, an object of the present invention is to provide a nuclear fusion apparatus in which a central support stay can sufficiently withstand the centripetal force of the toroidal coils and has a high electrical resistance in the circumferential direction of the central support stay, in which the structure of the central support stay is simple and yet facilitates operations for disposing lead wires in the central support stay, etc.

Another object of the present invention is to provide a nuclear fusion apparatus in which the poloidal coils are easily positioned in the circumferential direction of the central support stay.

Accordingly, the present invention provides a nuclear fusion apparatus comprising a central support stay assembly, two or more poloidal coils disposed in the circumferential direction of the central support stay assembly, and two or more toroidal coils radially disposed around and adjacent to the central support stay assembly. The central support stay assembly includes a central support stay portion and a radial arrangement for supporting the poloidal coils and for withstanding the centripetal force of the toroidal coils. The radial arrangement includes two or more radial portions extending radially from the central support stay portion and spaced circumferentially from each other at predetermined angles. Each of the radial portions has a radial member radially extending from the central support stay portion and a force transmission member disposed at the radial outer end of the radial member for transmitting forces from at least two toroidal coils to each radial member.

The invention also provides a nuclear fusion apparatus comprising a central support stay assembly having a central support stay portion and two or more radial portions. The radial portions extend radially from the central support stay portion and are circumferentially spaced from each other at predetermined angles. Each of the radial portions includes a movable radial member which is connected to the central support stay portion and is movable in the radial direction of the central support stay assembly. The nuclear fusion apparatus also comprises two or more poloidal coils which are disposed in the circumferential direction of the central support stay assembly and which are supported by the radial portions. A groove for receiving at least one of the poloidal coils is formed at the radial outer end of each radial member. The nuclear fusion apparatus further comprises a plurality of toroidal coils which are radially disposed around the central support stay assembly and which are adjacent to the radial outer ends of the radial portions.

The present invention further provides a nuclear fusion apparatus comprising a central support stay assembly having a central support stay portion and two or more of radial portions. The radial portions extend radially from the central support stay portion and are circumferentially spaced from each other at predetermined angles. The central support stay assembly is divided into two or more of support stay members in the axial direction of the central support stay assembly. Consequently, the central support stay portion and each radial portion are respectively divided into central support stay segments and radial segments. Each of the support stay members has a hole extending therethrough and the central support stay assembly further includes a bolt inserted into the hole of each of the support stay members and a nut screwed onto the bolt. The nuclear fusion apparatus also comprises two or more poloidal coils which are disposed in the circumferential direction of the central support stay assembly and are supported by the radial portions. Each of the radial segments includes an outer end surface and a step portion for receiving at least one of the poloidal coils. The step portion has a flat portion which is perpendicular to the axis of each support stay member and which is adjacent to the radial outer end surface. The nuclear fusion apparatus further comprises two or more toroidal coils which are radially disposed around the central support stay assembly and which are adjacent to the radial outer ends of the radial portions. Each of the radial segments further includes a portion for withstanding the centripetal force from each of the toroidal coils at the radial outer end of the radial segment.

BRIEF DESCRIPTION OF THE DRAWINGS

The present invention will now be described with reference to the preferred embodiments thereof in conjunction with the drawings in which.

DETAILED DESCRIPTION OF THE PREFERRED EMBODIMENTS

Figure 1:
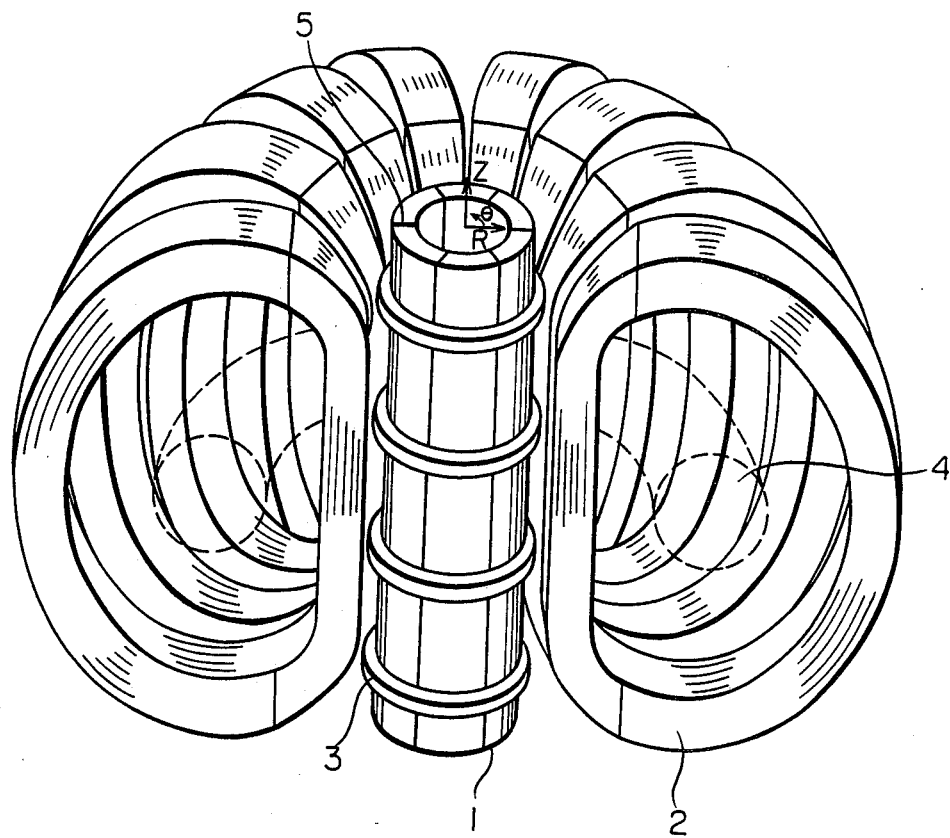
FIG. 1 is a perspective view of a conventional nuclear fusion apparatus.
Figure 2:
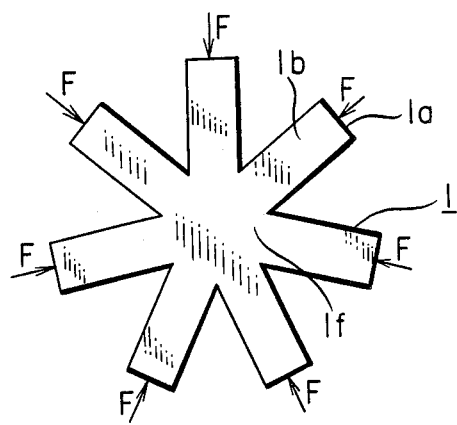
FIG. 2 is a plan view of a central support stay according to one embodiment of the present invention.
Figure 3:
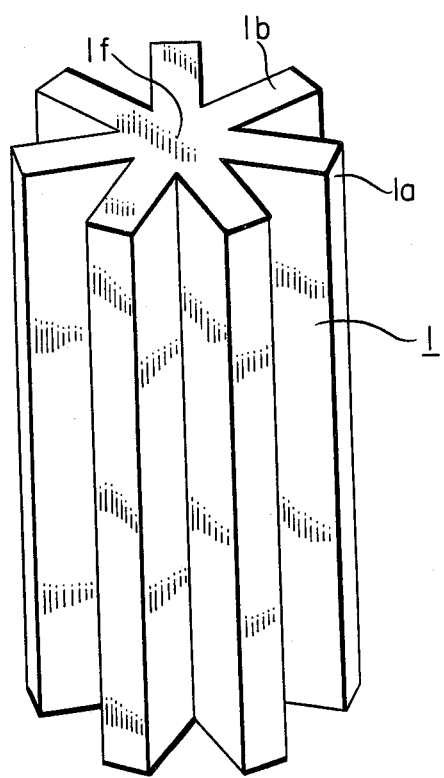
FIG. 3 is a perspective view of the central support stay of FIG. 1.

In FIGS. 2 and 3, a central support stay 1 according to a first embodiment of the present invention comprises a central support portion 1f extending along the axis of the central support stay 1 and a plurality of radial members 1b connected to the central support stay 1 and radially extending from the central support portion 1f and circumferentially spaced from each other at predetermined angles. The central support portion 1f and the radial members 1b are integrally formed. The number of radial members 1b is preferably equal to the number of toroidal coils 2 circumferentially spaced from each other as shown in FIG. 1. The radial outer end surface of each radial member 1b constitutes a load portion 1a to which a centripetal force F from each toroidal coil 2 is applied. A plurality of poloidal coils 3 are circumferentially disposed around the outer surfaces of the radial members 1b of the central support stay 1 and are spaced from each other along the axis of the central support stay 1.

In the first embodiment mentioned above, the centripetal force F generated in each toroidal coil 2 is applied to the load portion 1a of each radial member 1b. Each of the radial members 1b radially extend outwards from the central support portion 1f and have enough radial rigidity to withstand the centripetal force of each toroidal coil 2. Since the radial members 1b are spaced from each other at predetermined angles in the circumferential direction of the central support stay 1, the electrical resistance between the radial members 1b in the circumferential direction is higher than that in the conventional apparatus, and it is unnecessary to dispose electrically insulating materials between the circumferentially segmented portions as in the conventional apparatus. Further, the structure of the central support stay 1 mentioned above is simple.

Figure 4:
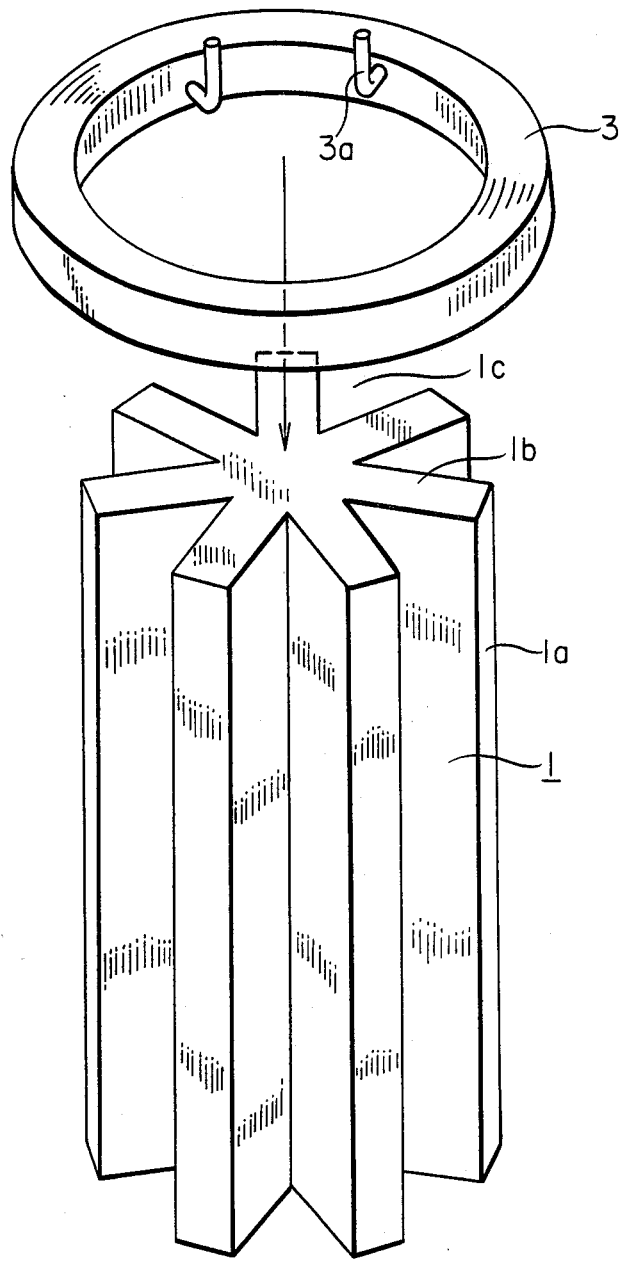
FIG. 4 is an exploded perspective view showing a state in which a poloidal coil is attached to the central support stay of FIG. 2.

As shown in FIG. 4, lead wires 3a for supplying an electric current to each of the poloidal coils are attached to the poloidal coils themselves which are then easily fitted onto the outer circumference of the central support stay 1 along the axial direction thereof by locating the lead wires 3a in the respective clearances 1c between the radial members 1b so that there is no need to perform operations for disposing holes and brazing as in the conventional apparatus.

Figure 5:
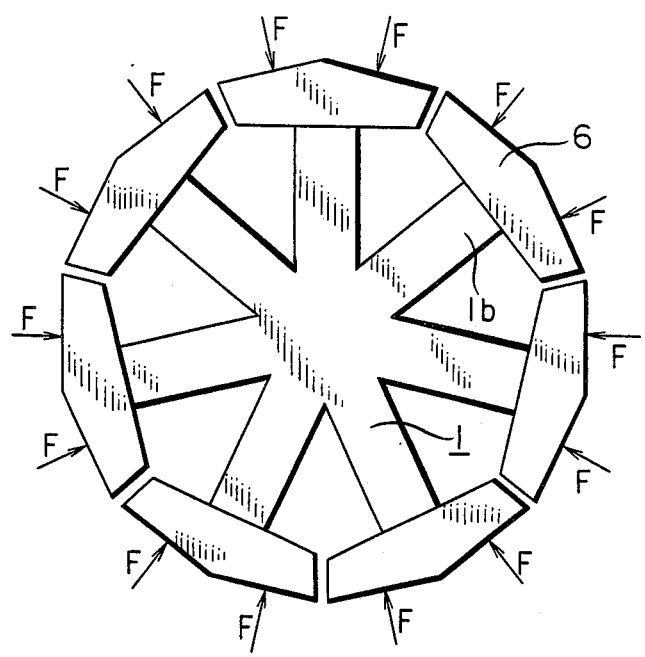
FIGS. 5 to 7 are plan views of central support stays according to second to fourth embodiments of the present invention.

The first embodiment mentioned above refers to a case in which the number of radial members 1b is equal to the number of toroidal coils 2. However, the number of radial members 1b may be one half the number of toroidal coils 2. In this case, as shown in FIG. 5, a force transmitting member 6 may be preferably disposed at the radial outer end of each radial member 1b such that the centripetal forces from two toroidal coils 2 are transmitted to one radial member 1b. Similar effects can be obtained even when the number of radial members 1b is a whole fraction of the toroidal coils.

In FIG. 4, although the lead wires 3a for supplying an electric current to the poloidal coils 3 are disposed therein, the assembly of the apparatus is similarly facilitated even when an opening end of a conduit for cooling, e.g., a superconduction coil used as each of the poloidal coils is disposed in each poloidal coil.

Figure 6:
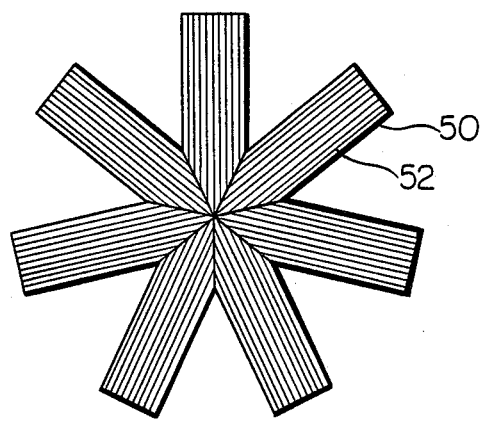
Figure 7:
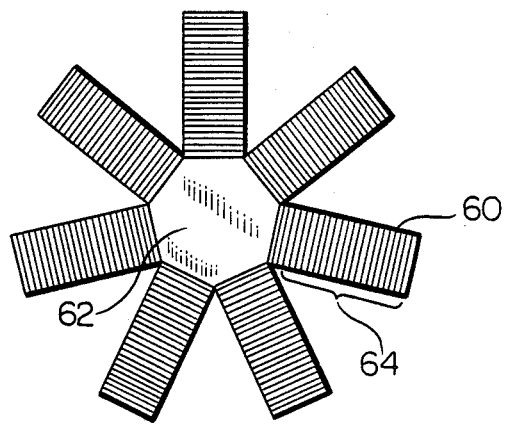

In the first embodiment, although the central support stay is integrally formed, as shown in FIG. 6, a central support stay 50 may be constituted of a plurality of circumferentially laminated layers 52 between which electrically insulating materials are disposed, thereby further increasing the electrical resistance in the circumferential direction of the central support stay. Furthermore, as shown in FIG. 7, a central support stay 60 may comprise a central support portion 62 and a plurality of radial members 64 radially extending from the central support portion 62 and each constituted of a plurality of layers laminated in the radial direction of the central support stay, thereby increasing the electrical resistance with respect to eddy currents radially generated in the radial members 64. In FIG. 7, the central support portion 62 may be constituted by a plurality of layers laminated in the axial direction of the central support stay. The embodiments shown in FIGS. 6 and 7 have an advantage in that it is unnecessary to use a large-sized material as the central support stay.

The central support stay may be made of metal or a highly electrically resistant material such as ceramic, FRP, etc. In the case of such highly resistant material, the central support stay can be integrally formed and no eddy current is generated in the central support stay.

As mentioned above, in a nuclear fusion apparatus according to the first embodiment, a central support stay can sufficiently withstand the centripetal forces of toroidal coils disposed around the central support stay and has a high electrical resistance in the circumferential direction of the central support stay, and has a simple structure in which it is easy to dispose lead wires for supplying electric current to each of the poloidal coils.

Figure 8:
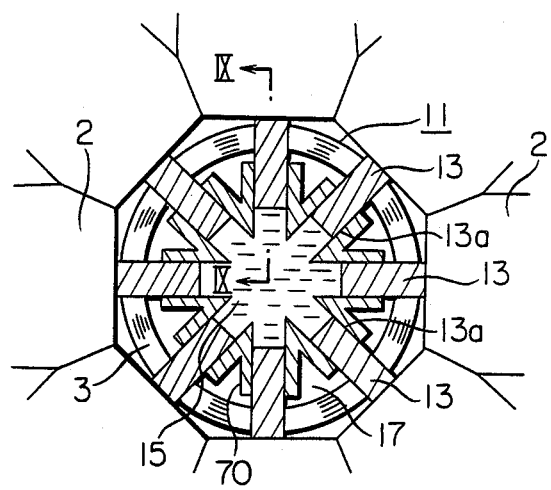
FIG. 8 is a cross-sectional view of a central support stay according to a fifth embodiment of the present invention.
Figure 9:
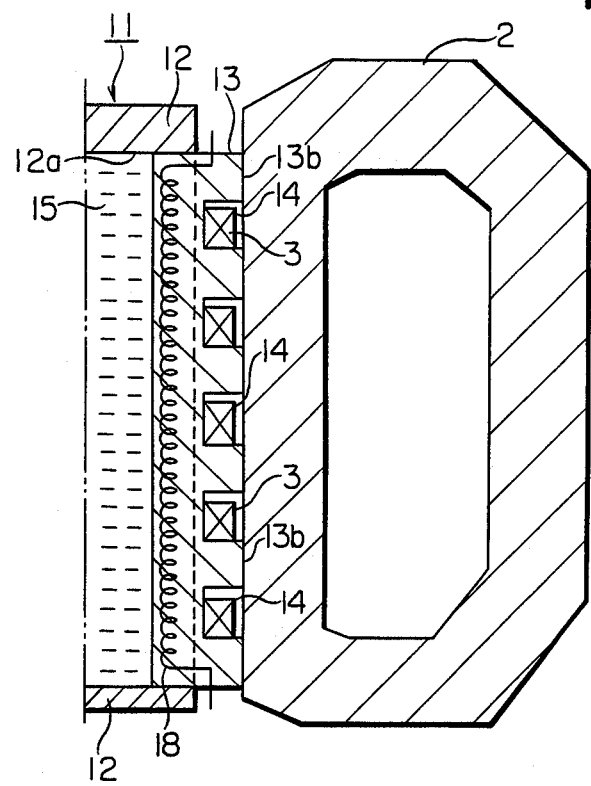
FIG. 9 is a longitudinal sectional view taken along Line IX—IX of FIG. 8.

FIGS. 8 and 9 show a fifth embodiment of the present invention. A central support stay 11 comprises central support portions 12 disposed at the top and bottom ends of the stay 11, and a plurality of radial members 13 radially disposed between the upper and lower support portions 12 and radially movable within respective radially arranged holders 70 with respect to the support portions 12 as described later. The radial members 13 are circumferentially spaced from each other at predetermined angles and each of them may be constituted by a member similar to a piston.

The sliding surfaces 13a of the radial members 13 and the contact surfaces 12a of the support portions 12 contacting the radial members 13 seal in oil tight cooperation with each other. An oil 15 is supplied into a central space defined by the support portions 12, the holder 70 and the radial members 13 and extending along the axis of the central support stay 11. The radial members 13 can be respectively radially moved by an oil pressure device for pressurizing the oil 15 within the central space. A plurality of grooves 14 for receiving poloidal coils 3 are circumferentially disposed at the radial outer ends of the radial members 13 and are spaced from each other along the axis of the central support stay 11. The poloidal coils 3 are held within the respective grooves 14 of the radial members 13 and can be attached to the respective radial members 13. The radial outer end surface 13b of each radial member 13 is adjacent each toroidal coil 2 and can withstand the centripetal force of each toroidal coil 2 as described later. Clearances 17 are formed between the radial members 13 in the circumferential direction of the central support stay 11 and are used for receiving pipes for the poloidal coils 3 through the clearances 17. The oil 15 in the central space can be heated by a heater 18 disposed in each radial member 13.

In the fifth embodiment constructed as above, each of the radial members 13 is radially movable with respect to the support portions 12 by the oil pressure device. Accordingly, the radial members 13 are first moved inwards such that the poloidal coils 3 are circumferentially disposed around the grooves 14 of the radial members 13 in the central support stay 11. The radial members 13 are then moved outwards by the oil pressure device for pressurizing the oil 15 so that the poloidal coils 3 can be respectively fitted into the grooves 14 of the radial members 13. The poloidal coils 3 within the grooves 14 are thus respectively supported by the radial members 13. When the pressure applied to the oil 15 is increased by the oil pressure device, the outer end surfaces 13b of the radial members 13 respectively contact and press the toroidal coils 2 outwards so that the radial members 13 can withstand the centripetal forces generated in the toroidal coils 2 at the outer end surfaces 13b thereof.

In the fifth embodiment mentioned above, when the nuclear fusion apparatus is operated, after a predetermined pressure has been applied to the oil 15 by the oil pressure device such that the radial members 13 press the toroidal coils 2 outwards to withstand the centripetal forces thereof, the clearances 17 are filled with, e.g., liquid nitrogen to solidify the oil 15 and the operation of the oil pressure device is then stopped. Thus, the poloidal coils 3 can be more efficiently cooled and thereby the vaporisation of liquid helium filling the grooves 14 therewith for cooling the poloidal coils 3 can be lowered.

In the maintenance of the nuclear fusion apparatus, the liquid nitrogen is removed from the clearances 17 and the solidified oil 15 is reliquefied by heating the oil by the action of the heater 18 disposed in each radial member 13. The pressure of the oil 15 is then decreased by the oil pressure device so that the radial members 13 can be moved inwards, thereby releasing the poloidal coils 3 from out of the grooves 14 of the radial members 13. Both the central support stay 11 and the poloidal coils 3 can be integrally taken out with slight clearances between the radial members 13 and the toroidal coils 2, instead of moving the radial members 13 completely into the portion between the upper and lower support portions 12.

Figure 10:
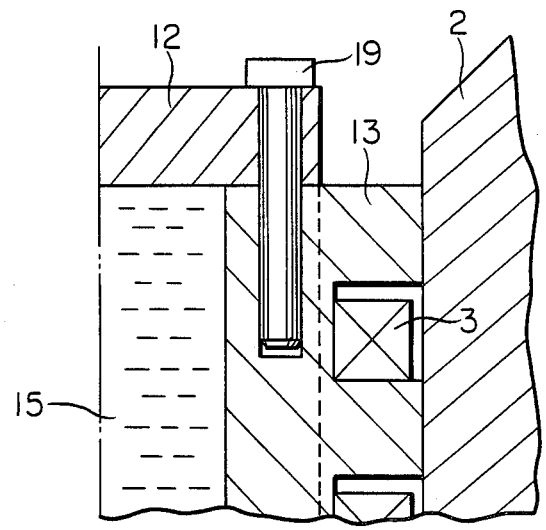
FIG. 10 is a partially longitudinal sectional view of a central support stay according to a sixth embodiment of the present invention.
Figure 11:
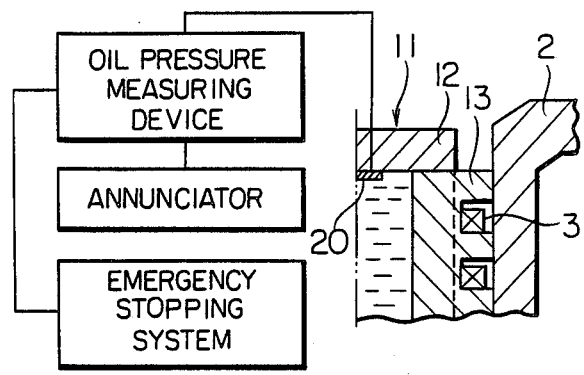
FIG. 11 is a view showing a system for measuring the oil pressure in a central support stay in a seventh embodiment of the present invention.

In the fifth embodiment, the oil 15 is solidified to hold the radial members 13 in predetermined positions, but other means for holding the radial members 13 in positions may be used. For example, as in a sixth embodiment shown in FIG. 10, a bar member 19 inserted into holes formed in each radial member 13 and each support portion 12 may be used to fix each radial member 13 to each support portion 12. Furthermore, instead of solidifying the oil 15, the operation of the heater 18 may be adjusted so as to maintain the oil 15 in a liquid phase at any time so that a pressure can be applied to the oil 15 even when the apparatus is operated. In this case, as in a seventh embodiment shown in FIG. 11, a sensor 20 for detecting the pressure of the oil 15 attached to the oil pressure device may be disposed in the central support stay 11 to measure the pressure of the oil in the central support stay 11 during operation of the apparatus such that the oil pressure can be suitably maintained. Furthermore, an annunciator or an emergency stopping device may be disposed as a safe system for any abnormal operation of the apparatus.

Although the radial members 13 are moved radially by the oil pressure, any other known means for withstanding the centripetal forces of the toroidal coils 2 may be used to move the radial members radially outwards.

In the fifth to seventh embodiments, each radial member in the central support stay is radially movable and has a groove at the radial outer end thereof for receiving a poloidal coil and they can be pressed outwards with a predetermined pressure for withstanding the centripetal force generated by the toroidal coils disposed around the central support stay. By such a construction, the electrical insulation in the circumferential direction of the central support stay is not reduced and the poloidal coils can be disposed without any additional means for positioning the poloidal coils around the central support stay. Furthermore, the assembly of the apparatus is simplified and the strength of the central support stay can be increased.

Figure 12:
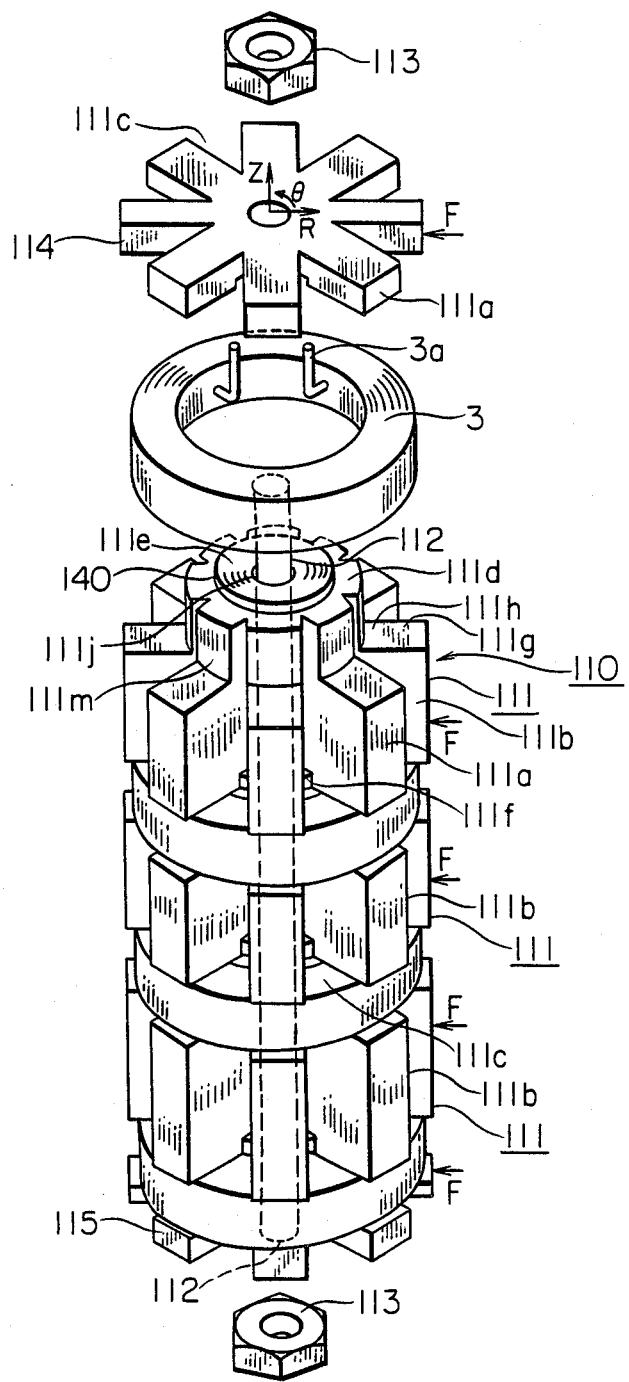
FIG. 12 is an exploded perspective view of a central support stay provided with poloidal coils according to an eighth embodiment of the present invention.
Figure 13:
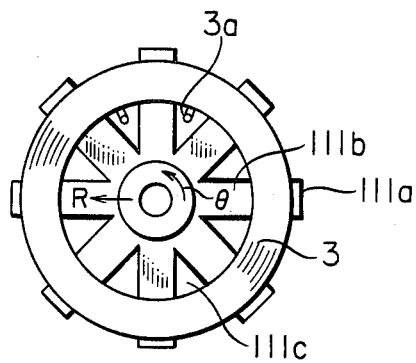
FIG. 13 is a plan view of the central support stay and the poloidal coils attached thereto of FIG. 12.
Figure 14:
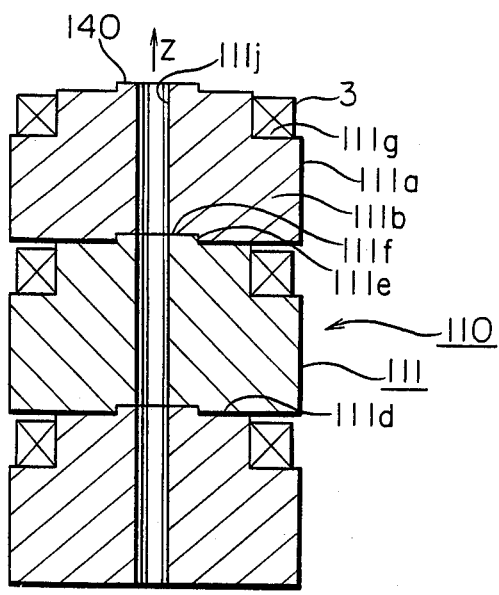
FIG. 14 is a longitudinal sectional view of the central support stay and the poloidal coils of FIG. 13.

FIGS. 12 to 14 show an eighth embodiment of the present invention. A central support stay 110 comprises a plurality of support stay members 111 segmented in the axial direction of the central support stay 110. Each of the support stay members 111 has a central support segment 140 and a plurality of radial segments 111b radially extending from the central support segment 140 and circumferentially spaced from each other at predetermined angles, thereby forming clearances 111c respectively between the radial segments 111b in the circumferential direction. The radial outer ends 111a of each radial segment 111b constitute portions for withstanding the centripetal force from each toroidal coil 2. A circular projected portion 111e and a circular recessed portion 111f are respectively disposed in the top and bottom of each support stay member 111. The projected portion 111e of each lower support stay member 111 is fitted into the recessed portion 111f of each upper adjacent support stay member 111 along the axis of each support stay member 111 to integrate the support stay members with each other in the assembly of the apparatus. The upper contact surface 111d of each support stay member 111 contacts the bottom surface of each upper adjacent support stay member 111 when the support stay members are assembled. A step 111h is disposed in the upper radial outer end portion of each radial segment 111b and has a vertical surface portion 111m extending in the axial direction of each support stay member 111 and a horizontal or flat surface portion 111g extending in the radial direction. Each of the poloidal coils 3 are arranged on the horizontal surface portion 111g of each step 111h as described later. Each of the support stay members 111 have a through hole 111j axially extending therethrough in the center of each support stay member 111 for receiving a fastener such as a bolt 112. When the support stay members 111 are assembled with each other in the axial direction, the through holes 111j of the support stay members are set to be aligned with each other along the axis of the central support stay 110. A nut 113 is screwed onto the bolt 112 to axially fasten the assembled support stay members 111 to each other. The uppermost support stay member 114 does not have the circular projected portion 111e nor the step 111h in the upper portion thereof. The lowermost support stay member 115 does not have the circular recessed portion 111f in the bottom thereof. The axial lengths of the uppermost and lowermost support stay members 114 and 115 are shorter than those of the support stay members disposed therebetween.

The number of radial segments 111b is preferably equal to the number of toroidal coils 2 as in the first embodiment.

When the poloidal coils 3 are disposed around the central support stay 110, the poloidal coils 3 are respectively located on the horizontal surfaces 111g of the steps 111h of the radial segments 111b in the lower support stay members 111 and the upper support stay members 111 are next assembled on the lower support stay members 111 such that the projected portion 111e of each lower support stay member 111 is fitted into the recessed portion 111f of each upper adjacent support stay member 111. The bolt 112 is then inserted into the central through hole 111j of each of the assembled support stay members 111 and fastens the assembled support stay members 111 to each other in cooperation with the nut 113 screwed onto the bolt 112. The poloidal coils 3 are firmly fixed between the assembled support stay members.

As shown in FIG. 12, centripetal forces F generated in the toroidal coils 2 are transmitted to the radial segments 111b of each support stay member 111 through the radial outer ends 111a thereof contacting the toroidal coils 2. The radial segments 111b radially extending outwards each have high rigidity in the radial direction of the support stay member 111 so that the radial segments 111b can withstand the centripetal forces of the toroidal coils 2 as in the first embodiment.

In the eighth embodiment shown in FIGS. 12 to 14, effects similar to those obtained in the first embodiment can be obtained.

Figure 15:
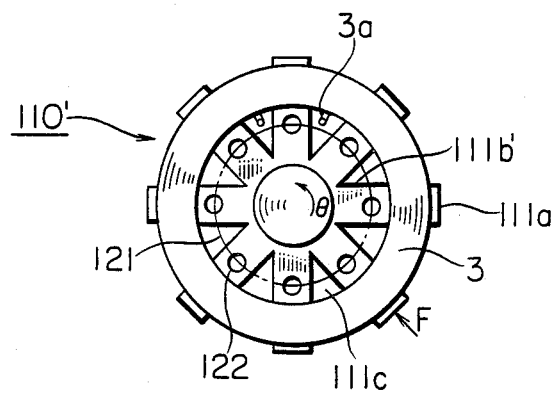
FIG. 15 is a plan view of a central support stay and poloidal coils attached thereto in a ninth embodiment of the present invention.
Figure 16:
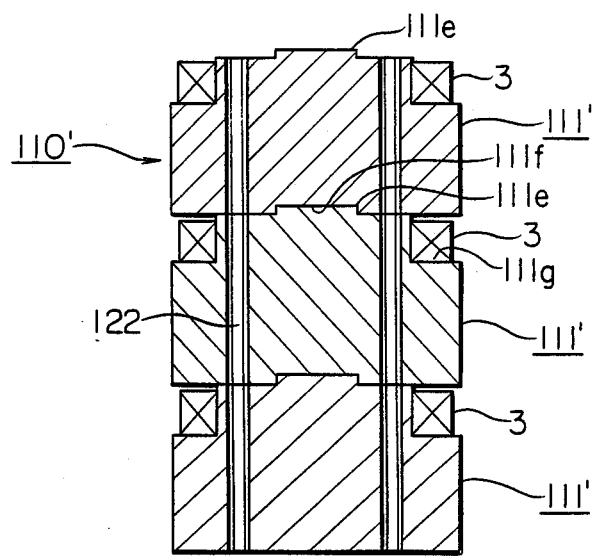
FIG. 16 is a longitudinal sectional view of the central support stay and the poloidal coils of FIG. 15.

In the eighth embodiment, the through hole 111j for receiving the bolt 112 is disposed in the central portion of each support stay member 111 to fasten the support stay members 111 to each other in the axial direction thereof. However, as in a ninth embodiment shown in FIGS. 15 and 16, a through hole 122 may be axially disposed in each radial segment 111b' of each support stay member 111' such that the axis of each through hole 122 is located on a common circle 121 the center of which is aligned with the axis of the central support stay 110'. Each of the through holes 122 receive a fastener such as a bolt for fastening the support stay members 111' to each other in combination with a nut. In this case, in the assembly of the support stay members, the support stay members 111' can be easily positioned in the circumferential directions thereof and fastened to each other in the axial directions thereof in a fashion inherently stronger than that of the eighth embodiment using only one bolt.

In addition, in the eighth embodiment, means for preventing the support stay members from being circumferentially rotated with respect to each other may be disposed between the adjacent support stay members to position the support stay members in the circumferential directions thereof.

According to the eighth and ninth embodiments, a central support stay comprises a plurality of support stay members segmented in the axial direction of the stay, and each of the support stay members has a central support segment and a plurality of radial segments radially extending therefrom and circumferentially spaced from each other at predetermined angles and provided with steps for receiving poloidal coils. The respective support stay members are fastened and fixed to each other by a fastener inserted into through holes extending through the respective support stay members along the axial direction thereof. Therefore, the poloidal coils are firmly fixed to the support stay members therebetween and the support stay members can sufficiently withstand the centripetal forces of the toroidal coils.

What is claimed is:

1. A nuclear fusion apparatus comprising:
   central support stay means;
   a plurality of poloidal coils disposed in the circumferential direction of said central support stay means; and
   a plurality of toroidal coils radially disposed around and adjacent to the central support stay means, said central support stay means including a central support stay portion and radial means for supporting said poloidal coils and for withstanding the centripetal force of said toroidal coils, said radial means comprising a plurality of radial portions extending radially from said central support stay portion and spaced circumferentially from each other at predetermined angles, each of said radial portions including a radial member radially extending from said central support stay portion and a force transmission member disposed at the radial outer end of said radial member for transmitting forces from at least two toroidal coils to each radial member.

2. A nuclear fusion apparatus as claimed in claim 1, wherein the number of radial portions equals the number of toroidal coils divided by an integer.

3. A nuclear fusion apparatus as claimed in claim 1, wherein said central support stay means is divided into a plurality of support stay members in the axial direction of the central support stay means, and said support stay members are fastened to each other by a fastener in the axial directions thereof, and each of said support stay members has a central support stay segment and a plurality of radial segments radially extending from the central support stay segment and circumferentially spaced from each other at predetermined angles, respectively forming said central support stay portion and said radial portions of the central support stay means, each of said radial segments having a step portion for receiving each of the poloidal coils.

4. A nuclear fusion apparatus as claimed in claim 1, wherein said central support stay members comprises a plurality of layers laminated to each other.

5. A nuclear fusion apparatus as claimed in claim 4, wherein said central support stay means comprises a plurality of layers laminated to each other in the circumferential direction of the central support stay means.

6. A nuclear fusion apparatus as claimed in claim 4, wherein each of said radial portions comprises a plurality of layers laminated to each other in the radial direction thereof.

7. A nuclear fusion apparatus as claimed in claim 1, wherein said central support stay means comprises a highly electrically resistant material.

8. A nuclear fusion apparatus comprising:
central support stay means having a central support stay portion and a plurality of radial portions radially extending from said central support stay portion and circumferentially spaced from each other at predetermined angles, each of said radial portions including a movable radial member movably connected to the central support stay portion in the radial direction of the central support stay means;
a plurality of poloidal coils disposed in the circumferential direction of said central support stay means and supported by said radial portions, a groove for receiving at least one of the poloidal coils being formed at the radial outer end of each radial member; and
a plurality of toroidal coils radially disposed around the central support stay means and adjacent to the radial outer ends of said radial portions.

9. A nuclear fusion apparatus as claimed in claim 8, wherein said radial member is radially moved by the pressure of a liquid supplied into a space defined by said central support stay portion and said radial portions.

10. A nuclear fusion apparatus as claimed in claim 9 further comprising means for solidifying the pressurized liquid whereby the pressure applied to said radial members is maintained by the solidification of the pressurized liquid.

11. A nuclear fusion apparatus as claimed in claim 10 wherein said solidifying means includes means for super-cooling the pressurized liquid.

12. A nuclear fusion apparatus as claimed in claim 11 further comprising a heater disposed in at least one radial member whereby said solidified liquid is liquefied by said heater.

13. A nuclear fusion apparatus as claimed in claim 9 wherein the pressure applied to said radial members is held by a holder for holding each radial member in position with respect to the central support stay portion.

14. A nuclear fusion apparatus comprising:
central support stay means having a central support stay portion and a plurality of radial portions radially extending from said central support stay portion and circumferentially spaced from each other at predetermined angles, said central support stay means being divided into a plurality of support stay members in the axial direction of the central support stay means whereby the central support stay portion and each radial portion are respectively divided into central support stay segments and radial segments, each of the support stay members having a through hole extending therethrough and said central support stay means further including a bolt inserted into the through hole of each of the support stay members and a nut screwed onto the bolt;
a plurality of poloidal coils disposed in the circumferential direction of said central support stay means and supported by said radial portions, each of said radial segments including an outer end surface and a step portion for receiving at least one of the poloidal coils, said step portion having a flat portion perpendicular to the axis of each support stay member and adjacent to the radial outer end surface; and
a plurality of toroidal coils radially disposed around the central support stay means and adjacent to the radial outer ends of said radial portions, each of said radial segments further including a portion for withstanding the centripetal force from each of the toroidal coils at the radial outer end of each radial segment.

15. A nuclear fusion apparatus as claimed in claim 14, wherein each of said support stay members has recessed and projected portions disposed on opposite end surfaces of each support stay member in the axial direction thereof and fitted into each other to integrate the adjacent support stay members with each other.

16. A nuclear fusion apparatus as claimed in claim 14, wherein said through hole extends through each of the support stay members such that the axis of the through hole is the same as the axis of each support stay member.

17. A nuclear fusion apparatus as claimed in claim 16, wherein means for preventing the adjacent support stay members from being relatively displaced in the circumferential direction thereof is disposed in each of the support stay members.

18. A nuclear fusion apparatus as claimed in claim 14, wherein said through hole extends through each support stay member such that the axis of each of said through holes is located on a concentric circle around the axis of each support stay member.

* * * * *